United States Patent [19]

Wade et al.

[11] Patent Number: 4,686,827
[45] Date of Patent: Aug. 18, 1987

[54] FILTRATION SYSTEM FOR DIESEL ENGINE EXHAUST-II

[75] Inventors: Wallace R. Wade, Farmington Hills; Vemulapalli D. N. Rao, Bloomfield Township, Oakland County both of Mich.

[73] Assignee: Ford Motor Company, Dearborn, Mich.

[21] Appl. No.: 849,927

[22] Filed: Apr. 9, 1986

Related U.S. Application Data

[62] Division of Ser. No. 463,686, Feb. 3, 1983.

[51] Int. Cl.$^4$ .............................. F01N 3/02
[52] U.S. Cl. ......................... 60/286; 60/297; 60/303; 55/282; 55/DIG. 30; 422/169; 422/174; 422/178
[58] Field of Search .............. 60/274, 286, 303, 297; 55/282, 283, DIG. 30; 422/169, 174, 178, 181

[56] References Cited

U.S. PATENT DOCUMENTS

| | | | |
|---|---|---|---|
| 4,449,362 | 5/1984 | Frankenberg | 60/274 |
| 4,450,682 | 5/1984 | Sato | 60/286 |
| 4,485,621 | 12/1984 | Wong | 60/274 |

Primary Examiner—Douglas Hart
Attorney, Agent, or Firm—Joseph W. Malleck; Roger L. May

[57] ABSTRACT

A filtration system operative to remove oxidizable particulates from the exhaust gas of a diesel engine is disclosed. The system has a filter element to trap and collect particulates in the exhaust gas, ignition means supplied with energy for a period only sufficient to ignite a leading portion of the particulate collection, and means for conducting a flow of gas with excess oxygen thorough the filtration means immediately following ignition without addition of other energy, the flow of gas with excess oxygen being utilized to support the continued oxidation of the ignited particulate collection. The ignition means may comprise (a) apparatus for adding excess hydrocarbon fuel either to (i) the gas flow through the intake manifold of the engine, (ii) the exhaust gas exiting from the engine, or (iii) a separate supply of compressed air, and (b) a supplementary heated catalyst located between the exhaust manifold of the engine and the filter element for acting upon the hydrocarbon rich gas flow, the catalyst being effective to bring about ignition of the hydrocarbon rich gas and produce a heated exhaust gas high enough in temperature to ignite at least a portion of the particulates in the filter element.

2 Claims, 6 Drawing Figures

FILTRATION SYSTEM FOR DIESEL ENGINE EXHAUST-II

This is a Division of application Ser. No. 463,686, filed Feb. 3, 1983 pending.

BACKGROUND OF THE INVENTION AND PRIOR ART STATEMENT

State of the art engine technology may allow a diesel engine to emit as low as 0.6 gm/mile particulates. However, with more strigent particulate emission requirements to come into effect in 1985, such as at a level of 0.20 gm/mile, the technology cannot meet such lower level of particulate emissions without some form of particulate trap. The most important materials used to date by the prior art for the trap material have included rigid and fibrous ceramic filter materials (see U.S. Pat. No. 4,276,071, ceramic wall flow monolith particulate filter) and wire mesh (see U.S. Pat. No. 3,499,269), each material having its own characteristic mode of trapping. Some of these filter materials have been coated with catalysts in the hope it would facilitate incineration of the collected carbon material. Unfortunately, the placement of the coating as a layer throughout the filter has proven not to lower the incineration temperature effectively and, more importantly, has produced unwanted sulphates.

The particulates emitted and trapped throughout the life of a vehicle cannot be stored since the amount can be typically 20 cubic feet for each 100,000 miles of engine use. As the particulates build up, the exhaust system restriction is increased. Thus, a means is required to remove the trapped material periodically, commonly referred to as regeneration of the filter. One of the most promising methods found to date is rejuvenation of the filter by thermal oxidation of the carbonaceous particles, which incinerate at about 1200° F. (600° C.).

Normal diesel engine exhaust temperatures rarely reach 1200° F. during normal driving. Therefore, an auxilliary temperature elevating means is necessary to carry out therma oxidation. The types of thermal oxidation means used by the prior art have generally fallen into the following three categories: use of a fuel fed burner (see U.S. Pat No. 4,167,852 and Japanese Pat. No. 55-19934), use of an electric heater (see U.S. Pat. Nos. 4,270,936; 4,276,066; 4,319,896), and detuning techniques, which may be combined with any of the above, for raising the temperature of the exhaust gas temperature at selected times (see U.S. Pat. Nos. 4,211,075; 3,499,269). These techniques have been used to burn the collected particles in the presence of excess oxygen.

With respect to fuel burners, they are disadvantageous because: (a) they require more fuel than for normal vehicle operation when they function as the sole means to raise the temperature of the entire mass of the filter system, and (b) can only be used for regeneration in certain limited cruise conditions of the engine when used in line with exhaust flow. In addition, such an addition is prone to malfunction and can pose safety problems unless an adequate control system is provided.

With respect to electrical heating used as the sole means to raise the temperature of the entire mass of the filter system to an incineration temperature: (a) it is inefficient; and (b) it requires a disproportionate supply of electrical power, which is not readily available with current vehicles, and would require significant redesign of the power supply system.

As to detuning techniques, they are difficult to operate to reliably achieve adequate incineration temperatures, may have an adverse effect on engine emissions, and may cause premature failure of the filter material.

What is needed is a filtration system for diesel engines which uses considerably less energy than that envisioned by the prior art regneration techniques, has increased reliability for incineration, does not affect other measures taken to control engine emissions, reduces the complexity of the controls needed for the regeneration system, and is independent of engine operation for optimum regeneration.

SUMMARY OF THE INVENTION

The invention is a filtration system operative to remove oxidizable particulates from the exhaust gas of a diesel engine. The system comprises (a) a filtration means having a filter element operative to filter out and collect a substantial portion of the entrained particulates in the exhaust gas, (b) an ignition means having a source of energy selectively supplied for a limited period to effect the lighting of a leading portion of said particulate collection, and (c) means for conducting a flow of gas with excess oxygen through said filtration means immediately following said ignition, without the addition of energy. The flow of gas with excess oxygen is utilized to support continued oxidation of said lighted particulate collection.

It is preferred that the ignition means use a source of energy which is a combustible mixture of hydrocarbon fuel and a combustion supporting gas, and a supplementary heated catalyst effective to act upon the mixture to bring about ignition of the mixture at a lower temperature. Advantageously, an electrical resistance heater is coupled with a catalyst to lower the necessary ignition temperature of the combustible mixture. The mixture may be formed by the addition of atomized hydrocarbon fuel to a portion of the exhaust gas (either at the intake manifold, exhuast manifold, or exhuast conduit leading to the filtration system), or by addition to a separate pressurized flow of air. It is most advantageous to form the ignition means as a foraminous member having a plurality of closely nested straight flow channels, the channel walls having an apparent porosity of at least 25% with pores of about 5-40 microns with 10-18 microns average diameter. The walls of the foraminous member carry a catalyst material effective to lower the ignition temperature of the combustible mixture passing therethrough, thrby requiring less input of energy in the form of either hydrocarbon fuel or the amount of electricity required to operate the electrical resistance heating element. Preferably, the electrical resistance heating element is embedded within the foraminous member at the entrance in the form of a flat electrical resistance wire.

Optimally, the catalyst coated foraminous member is located in front of the entrance to the filter element and may be in spaced relation thereto (by as much as 2-4 inches). The foraminous catalyst coated member is heated so that it will reach an entrance temperature of about 500°-700° F. and a exit temperature of at least 1200° F. This latter temperature is attained by the oxidation of hydrocarbon and carbon monoxide gases at the surface of the catalyst, the latter being sufficient to ignite the carbonaceous material on the filter element.

The filtration system may additionallly comprise a flow control means which has a flot diverter effective to normally bypass the exhaust gas flow around the ignition means to avoid sulphate formation, but through the filter during normal operation of the filtration system. The diverter is selectively operated to switch the exhaust gas flow through the ignition means when regeneration of the filter is desired in order to heat the catalyst so as to minimize the external heat requirement.

Yet still another alternative has a flow diverter, again effective to normally bypass the exhaust gas flow around the ignition means, but through the filter during normal operation of the filtration system. However, in the regenerative mode, the exhaust gas is additionally diverted around the filter as well as the ignition means, while conducting a separate flow of hydrocarbon fuel and a combustion supporting gas through the ignition means to initiate regeneration.

DETAILED DESCRIPTION

The invention is an apparatus system wherein a small but limited amount of energy is required to ignite the leading portion of a collection of particulates in a diesel engine trap, allowing the exothermic reaction of the burning of the remaining particulates to sustain and continue the oxidation process. Particulates are defined herein, and by the EPA, as any matter in the exhaust of an internal combustion engine, other than condensed water, which can be collected on a special filter after dilution with ambient air to a temperature of 125° F. (52° C.) maximum. This includes agglomerated carbon particles, adsorbed hydrocarbons, including known carcinogens, and sulphates. Particulates are extremely small, having a mass median diameter of 4-12 micro inches, and are extremely light (one pound of particulate matter will occupy 350 cubic inches).

Figure 1:
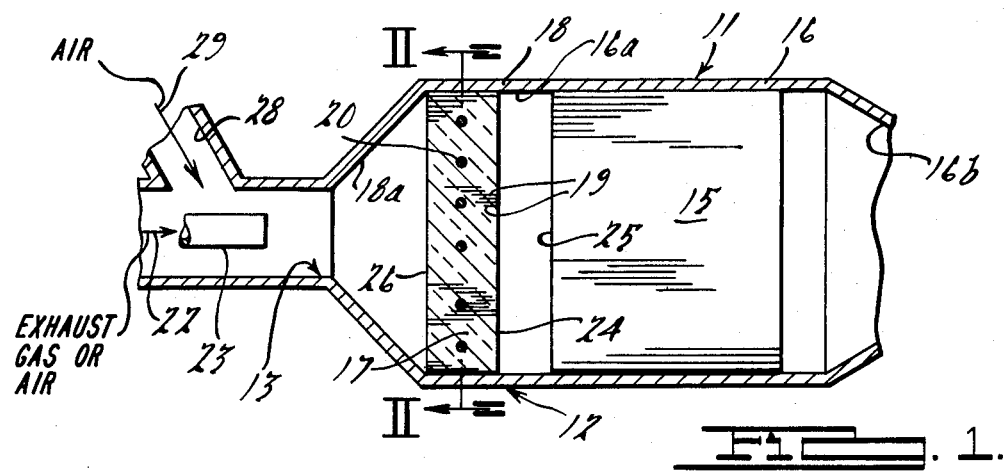
FIG. 1 is a schematic elevational view of a filtration system for removing the particulates from a diesel engine embodying the principles of this invention.
Figure 2:
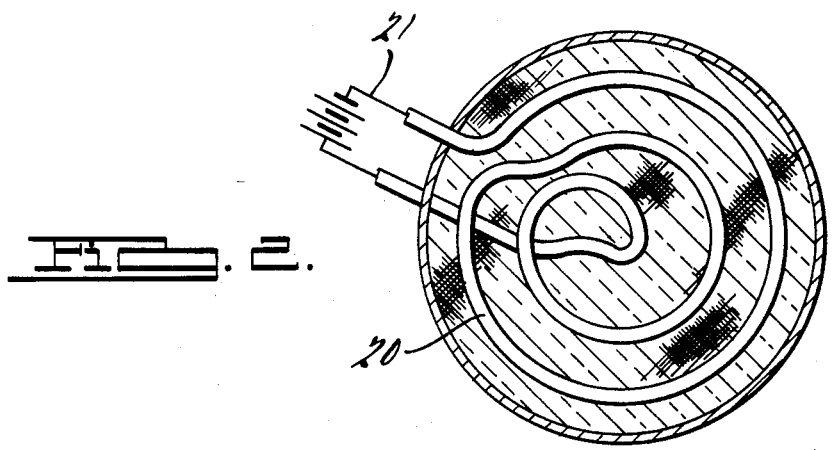
FIG. 2 is a sectional view taken substantially along line 2—2 of FIG. 1.
Figure 3:
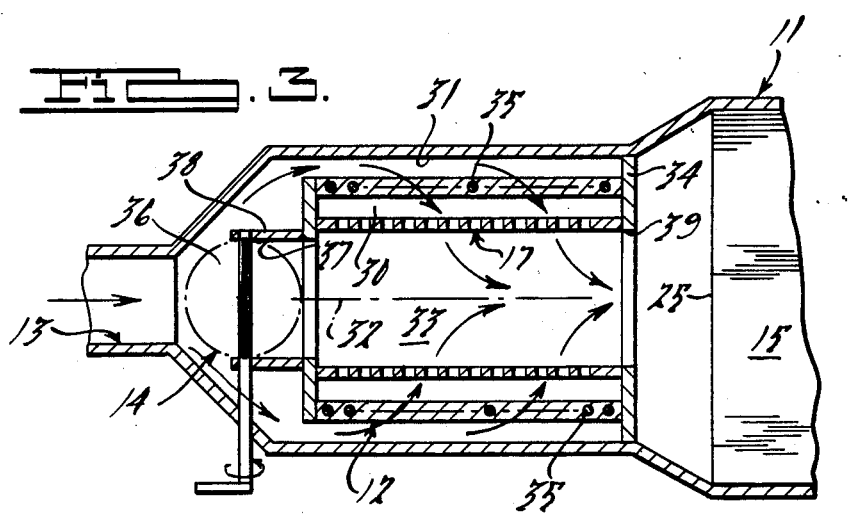
FIG. 3 is another embodiment of this invention wherein a flow control system is used so that the exhaust gas is bypassed about the ignition means of the regenerative system during normal operation.
Figure 4:
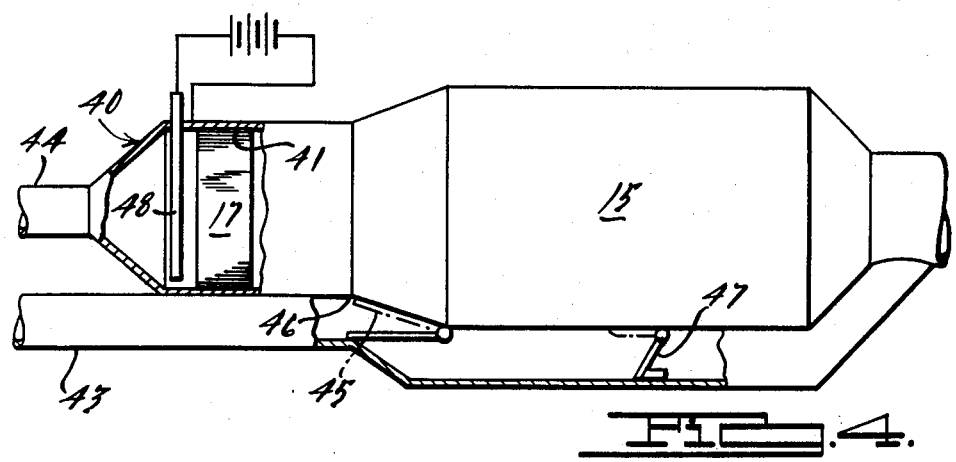
FIG. 4 is yet another alternative embodiment of this invention wherein a flow control system is used to bypass the exhaust gas around the catalyst coated foraminous member and filter element during regeneration, but conducts exhaust gas through the catalyst coated foraminous member and filter element during normal operation.

As shown in FIGS. 1-2, the filtration system comprises, broadly, a filtration means 11, an ignition means 12, means 13 for conducting an excess oxygen flow, and a flow control means 14 (see FIGS. 3-4). The filtration means particularly comprises a filter element 15 which may be comprised of a rigid or fibrous ceramic such as aluminum silicate, or of fine metallic mesh. The art of making such ceramic filter materials is well known (see U.S. Pat. Nos. 4,340,403; 4,329,162; and 4,324,572). Similarly, the art of making fine wire mesh trapping materials is also well known (see U.S. Pat. No. 3,499,269).

One preferred trapping material construction comprises a porous ceramic honeycomb similar to that used for monolithic catalysts on gasoline engines. The parallel aligned open channels of the honeycomb are alternately blocked with high temperature ceramic cement at the top and bottom so that all of the inlet gas flow must pass through the porous ceramic walls before exiting from the trap. This honeycomb trap provides very high filtration surface area per unit volume. For example, a 119 cubic inch trap of this configuration with 100 cells per square inch and 0.017 inch wall thickness has approximately 1970 square inches of filtering surface area, and the filtering surface area per unit volume for such a trap would be 16.6 square inches per cubic inch.

The mechanical trapping mechanism for the filter element 15 is essentially by interception, although some form of diffusion may also take place. The filtration means is preferably formed as a cylinder, one flat end of the cylinder acting as the frontal interface with the incoming gas flow. The cylinder is encased in a metallic housing 16 having entrance walls 16a and exit walls 16b. The alternate channels should preferably be aligned so that they are aligned with the direction of flow, such as shown in FIG. 1. When the particulates collect on the trap, they will nest within the porosity of the walls which are aligned parallel to the direction of flow. Thus there can be a general uniform distribution of particulate collections along the length of the trap.

The ignition means 12 is comprised of a channelized foraminous member 17 which may be similarly shaped as a cylinder, but having an overall length which is considerably shorter than that of the filter element, such as one-fourth. The member 17 is enclosed in a housing 18 having tapered (i.e., 3-6 inches) diameters, inlet walls 18a, and an exit which commonly connects with the housing 16. The member 17 preferably has direct through channels 19 defined by walls which are not particularly porous. The member may be formed by winding aluminum oxide strands into a wall pattern containing the through channels. Any porosity in the aluminum oxide strands is small, typically 40-50Å in diameter. The member 17 can also be constructed of other ceramic materials such as mullite aluminum titanate.

Most importantly, the element 17 is coated with a catalyst which may close or partially close the pores of the foraminous walls. The foramina of the element gives a high surface area for exposure to the gases passing through channels 19. A catalyst is herein defined to mean finely distributed discrete particles of very high surface ara that promote the reaction of carbon monoxide and hydrocarbons with oxygen. Preferably the catalyst may be selected from the group consisting of platinum, platinum-palladium, palladium-rubidium.

The catalyst coated foraminous member 17 has an electrical resistance heating element 20 embedded therein, preferably in the form of a torous shaped wire as shown in FIG. 2. The heating element, of course, is supplied with a suitable source of electrical energy through appropriate wiring 21 which may be about 600 watts, sufficient to raise the temperature of the member 17 to the range of 500°-700° F. (which is effective to ignite a combustible mixture of hydrocarbon fuel and exhaust gas or air).

The hydrocarbon rich flow of gas 22 is a necessary part of the ignition means and is passed uniformly through the catalyst coated foraminous member. The flow of gas is supplied with atomized hydrocarbon fuel droplets from a nozzle 23, such fuel being preferably diesel, but can also be in other forms such as propane, kerosene, or compressed natural gas. Excess hydrocarbon fuel may be added either to (i) the gas flow through the intake manifold of the engine (see FIG. 6), (ii) the exhaust gas exiting from the engine (see FIG. 5), or (iii) a separate supply of compressed air fed to the catalyst (see FIG. 4).

The placement of the catalyst coated foraminous member is of some significance. In the preferred mode the axis 24 of the member is aligned with the axis of flow 22; member 17 has a length of about 2-4.5 inches with the trailing face 24 thereof spaced a distance of about 2-4 inches from the front face 25 of the filter element 15. In this manner the flow of the combustible hydrocarbon fuel/gas mixture can be ignited at a temperature of about 400°-700° F. at the front face 26 of the catalyst coated foraminous member; by virtue of the exothermic reaction within member 17, the combusted mixture will reach a temperature at the trailing face 24 of the catalyst coated foraminous member of about 1200° F. The heated gas will continue to increase slightly in temperature as it travels across the gap of 2-4 inches, and assuredly posses sufficient temperature to light (ignite) the front face collection of particulates in the filter element. Collected carbon particles in the filter require an ignition temperature of at least about 1100° F. However, the trailing face 24 of the member 17 may be fitted or juxtaposed the front face 25 of the filter element if the diameters of housings 18 and 16 are substantially the same.

The means 13 conducts a flow of gas carrying excess oxygen for supporting combustion of the particulates. Means 13 particularly comprises conduit 28 which is effective to conduct a flow 29 derived from either exhaust gas of the engine itself or a separate supply of compressed fresh air. The flow 29 is used after ignition has taken place in the filter for purposes of sustaining the continued oxidation of the particulate material, facilitating propogation of the flame front at the entrance to the filter element through the entire length of the filter element. The invention provides a means of economically regenerating a filter at lower temperatures without sulphate formation and on a periodic basis. The necessary fuel for regeneration over the life of a vehicle is extremely small and can be contained in a small fuel reservoir separate from the engine fuel tank.

In the preferred embodiment there is no flow control means to divert the normal exhaust flow during regeneration or to bypass the catalyst coated foraminous member during any stage of operation. However, the flow control means 14 takes on some importance in the alternative embodiments.

The arrangement shown in FIG. 3 has the catalyst coated foraminous member 17 formed as a tube with the radial thickness of the tube wall 30 serving similar to the longitudinal walls of the filter in FIG. 1; the flow through the walls 30 is in a radial direction of the tube. The tube is mounted within a plenum chamber 31 leading to the frontal face 25 of the filter element and oriented so that its axis 32 is aligned with the direction of flow of the exhaust gas. Walls of the plenum chamber 31 are arranged so that the full front face of the flow can either enter the central core 33 of the foraminous member, thereby not requiring penetration through the walls 30 of the member 17 in a radial direction, or go around the exterior of the foraminous member and penetrate radially through the member walls 30 as the result of an annular stopping plate 34 at the trailing end of the plenum chamber 31. The electrical heater 35 is mounted in a manner which is in the outer surface region of the tubular arrangement. By use of a diverter 36, the exhaust gas, which is normally treated by the filter element during engine operation, is allowed to pass through the central core of the foraminous member, thereby bypassing the catalyst coated material. The diverter can be rotary operated. When regeneration is selected, the diverter is rotated so as to close off flow through the front core opening 37 of the core tube 38, forcing the exhaust flow to go about the exterior of the member 30, radially passing through the foraminous material and electric heater, into the interior hollow portion 33 and out through the trailing opening 39.

With this mode, hydrocarbons may be added to the incoming gas during a period of regeneration; the electrical heater, along with the catalyst coated foraminous member, may ignite such enriched gas at a relatively low temperature and raise it to an appropriate ignition temperature for the particulate material. The diverter structure for controlling the diversion of flow may also be an axially movable valve as opposed to a rotary operated valve requiring the plenum chamber to have a slightly different design of the flow channel to permit the use of an axially movable valve.

With the flow control means of FIG. 3, the flow diverter 36 is effective to normally bypass the exhaust gas flow around the ignition means and then through the filter element during normal operation of the system. The diverter then is selectively operated to divert the exhuast gas flow through the ignition means when regeneration of the filter element is desired.

FIG. 4 illustrated still another arrangement for the flow control means 14. In this embodiment, the plenum 40 comprises walls defining an ignition chamber 41 to receive the catalyst coated foraminous member 17. A first duct 42 is effective to carry the exhaust gas to plenum 40 and a second duct 43 to carry the exhaust gas around the ignition chamber and around the filter element 15 to communicate with the exhaust gas exiting from the filter element. A third duct 44 is used to carry a feed gas to the ignition chamber 41 for ignition purposes. A movable door or valve 45 is positioned to close off duct 43 in one position to permit the exhaust gases to enter the filter 15 via opening 46, and alternatively effective to open duct 43 in another position to permit bypassing the filter 15. To relieve the pressure of actuating valve 45, a coordinated valve 47 is positioned deep in duct 43 and closes when valve 45 is closed an vice-versa. Thus, the flow control means 14 has a flow diverter comprised of valves 45 and 47, which are effective to normally bypass the exhaust gas flow around the ignition means and through the filter element 15 during normal operation of the engine. The diverter may then be selectively moved so that the exhaust gas flow is directed not only around the ignition means, but also around the filter element 15 through the channel 43. During the regeneration stage, a separate flow of air and hydrocarbon enriched feed gas is transmitted through duct 44 to the front face of the catalyst coated foraminous member 17 in the ignition chamber 41; the feed gas is ignited by the assistance of electrical heating element 48 and heats to a temperature of at least 1100°

F. Once the front face of the particulate collection is ignited, fuel is no longer added to the feed gas and air is then conducted through the heater catalyst and filter element to carry out sustained incineration of the particulate collection.

Figure 5:
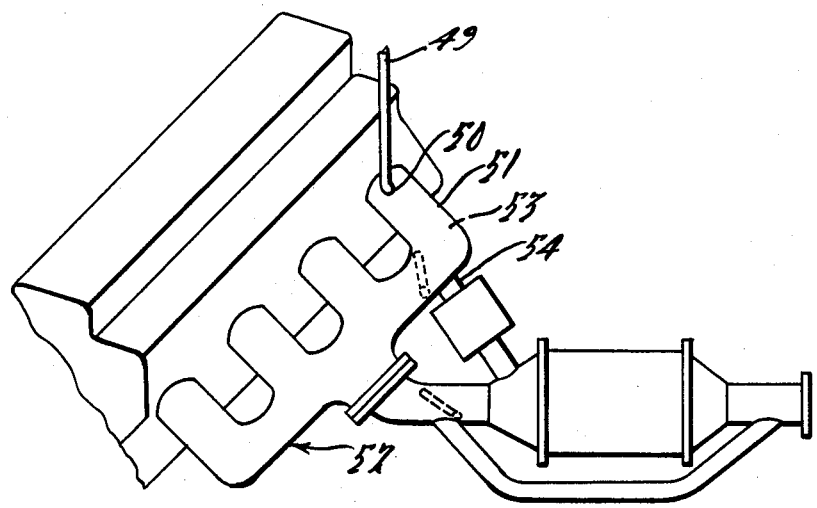
FIGS. 5-6 each show schematic variations of how hydrocarbon fuel can be added to the heated gas needed for regeneration.
Figure 6:
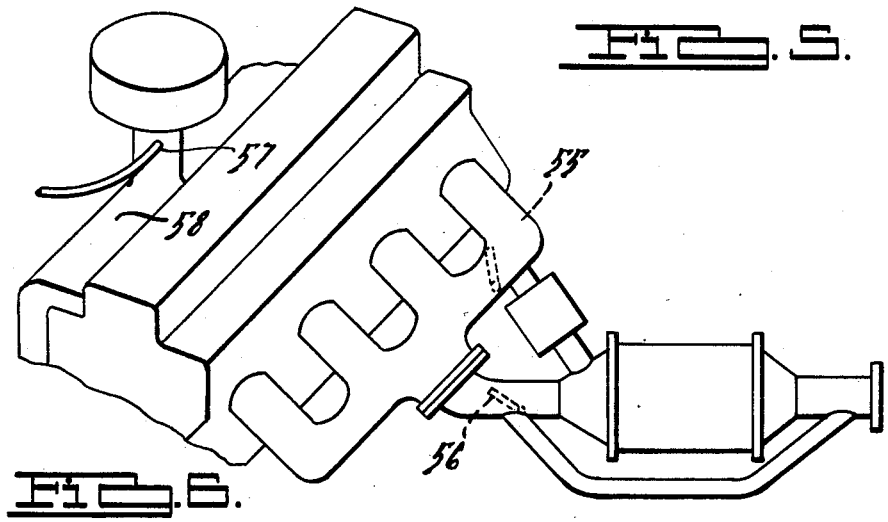

The addition of fuel or energy to the flow of heated gas, that is, the gas effective to promote ignition, may be promoted in two ways, as shown in FIGS. 5 and 6. In FIG. 5, a separate fuel nozzle 50 (fed by a diesel fuel line 49) is connected to one of the legs 51 of the exhaust manifold 52 of the engine, whereby fuel may be injected into the exhaust flow of leg 51 to create an atomized fuel/air suspension. The exhaust gas is diverted from that one leg 51, during regeneration, by a control valve 53 to enter a passage 54 leading to the filtration system. Alternatively, the exhaust gas may be enriched with hydrocarbon fuel by a split fuel injection system for the engine. In this system, diesel fuel is injected a second time to the combusion chamber of the engine (during the exhaust stroke) to create a fuel rich exhaust gas.

In the embodiment of FIG. 6, excess hydrocarbon fuel is added by fuel line and nozzle 57 to the intake manifold 58 of the engine during the desired regeneration period. The overly rich mixture is partially combusted by the engine and a portion of such exhaust gas therefrom is diverted for regeneration. At a selected regeneration time, valve 55 is actuated to divert such fuel rich exhaust gas to the filtration system, while vavle 56 is actuated to bypass the remainder of the exhaust gas.

We claim:

1. A filtration system operative to remove oxidizable particulates from the exhaust gas of a diesel engine, comprising:
    (a) filtration means having a filter element operative to filter out and collect a substantial portion of the entrained particulates in the exhaust gas;
    (b) ignition means having a source of energy selectively supplied for a limited period to effect ignition of the leading portion of said particulate collection, said ignition means being comprised of (i) a flow of hydrocarbon enriched exhuast gas, (ii) a tubular foraminous member carrying a catalyst material effective to lower the ignition temperature of said hydrocarbon enriched gas, (iii) a supplementary heating element effective to raise the temperature of the foraminous member and catalyst material to a catalyzed oxidation temperature of the hydrocarbon enriched gas, and (iv) a flow control means effective to normally permit the nonenriched exhaust gas to flow through the interior of the tubular member without transgressing the radial thickness of the tubular member; and, during regeneration, the hydrocarbon enriched exhuast gas is forced to pass in a radial direction of the foraminous member before exiting therefrom; and
    (c) means for conducting a flow a exhaust gas of said engine through said filtration means immediately following the ignition, without addition of other energy or hydrocarbon fuel, said flow of exhuast gas being utilized to support the continued oxidation of the ignited particulate collection.

2. A filtration system operative to remove oxidizable particulates from the exhaust gas of a diesel engine, comprising:
    (a) filtration means having a filter element operative to filter out and collect a substantial portion of the entrained particulates in the exhaust gas;
    (b) ignition means having a source of energy selectively supplied for a limited period to effect ignition of the leading portion of said particulate collection, said ignition means being comprised of (i) a flow of hydrocarbon enriched gas, (ii) a foraminous member carrying a catalyst material effective to lower the ignition temperature of said hydrocarbon enriched gas, said member having a plurality of through channels, each channel having walls with an apparent porosity of 25–65%m, and (iii) a supplementary heating element effective to raise the temperature of the foraminous member and catalyst material to a catalyzed oxidation temperature of the hydrocarbon enriched gas, said heating element being electrically supplied with energy at a level of at least 600 watts; and
    (c) means for conducting a flow of gas with excess oxygen through said filtration means immediately following the ignition, without addition of other energy or hydrocarbon fuel, said flow of gas with excess oxygen being utilized to support the continued oxidation of the ignited particulate collection.

* * * * *